United States Patent [19]

Germain et al.

[11] Patent Number: 5,500,202
[45] Date of Patent: Mar. 19, 1996

[54] PROCESS FOR THE MANUFACTURE OF HYDROGEN PEROXIDE BY DIRECT SYNTHESIS FROM HYDROGEN AND OXYGEN

[75] Inventors: Albert Germain; Jean-Paul Pirard, both of Liege; Véronique Delattre, Mons; Jacques Van Weynbergh, Brussels; Claude Vogels, Lasne, all of Belgium

[73] Assignee: Solvay (Société Anonyme), Brussels, Belgium

[21] Appl. No.: 338,796

[22] Filed: Nov. 7, 1994

Related U.S. Application Data

[63] Continuation of Ser. No. 87,129, Jul. 1, 1993, abandoned.

[30] Foreign Application Priority Data

Jul. 15, 1992 [BE] Belgium ............................... 09200657

[51] Int. Cl.$^6$ ................................................. C01B 15/01
[52] U.S. Cl. .......................................................... 423/584
[58] Field of Search ............................................. 423/584

[56] References Cited

U.S. PATENT DOCUMENTS 5,011,675 4/1991 Haure et al. ............................ 423/659
5,169,618 12/1992 Maraschino ............................ 423/584

FOREIGN PATENT DOCUMENTS 1056126 1/1967 United Kingdom .

OTHER PUBLICATIONS

G. Tosun, "A Study of Cocurrent Downflow of Nonforming Gas–Liquid Systems in a Packed Bed. Flow Regimes: Search for a Generalized Flow Map," Industrial Engineering Chemistry Process Design and Development vol. 23, pp. 29–35 (1984).

C. Oloman et al, "Hydrogen Peroxide Production In Trickle–Bed Electrochemical Reactors", *Journal Of Applied Electrochemistry*, vol. 9, 1979 pp. 117–123.

S. Goto et al, "The Role Of Mass Transfer In Trickle–Bed Reactors", *The Canadian Journal of Chemical Engineering*, vol. 54, Dec. 1976, pp. 551–555.

*Primary Examiner*—Wayne Langel
*Attorney, Agent, or Firm*—Spencer & Frank

[57] ABSTRACT

Process for the manufacture of an aqueous solution of hydrogen peroxide by direct synthesis from hydrogen and oxygen in a three-phase system, according to which hydrogen and oxygen are reacted directly in the gaseous state at the surface of a solid heterogeneous catalyst, the reaction being performed continuously in a reactor with a stationary trickle bed, filled with solid catalyst particles forming the stationary bed through which a liquid consisting of an aqueous solution and the gas phase containing the hydrogen and oxygen are made to trickle concurrently.

19 Claims, 4 Drawing Sheets

A

B

C

PROCESS FOR THE MANUFACTURE OF HYDROGEN PEROXIDE BY DIRECT SYNTHESIS FROM HYDROGEN AND OXYGEN

This application is a continuation of application Ser. No. 08/087,129, filed Jul. 1, 1993, abandoned.

The present invention relates to a process for the direct synthesis of hydrogen peroxide from hydrogen and oxygen. It relates more particularly to a process for the synthesis of hydrogen peroxide by heterogeneous catalysis.

It is known to produce an aqueous solution of hydrogen peroxide by electrochemical reduction of oxygen in a cell of the "trickle-bed" type (C. Oloman et al. Journal of Applied Electrochemistry 9, pages 117–123, London 1979).

However, this known process presents the disadvantage of requiring the use of a source of high intensity electrical current, which is not always available on the production site of the hydrogen peroxide solution.

The invention is aimed at overcoming this disadvantage of the known process by providing a process which makes possible the production of a solution of hydrogen peroxide from hydrogen and gaseous oxygen without requiring the use of a source of electrical current, under good safety conditions and with a high selectivity in relation to the hydrogen consumed.

To this end, the invention relates to a process for the manufacture of an aqueous solution of hydrogen peroxide by direct synthesis from hydrogen and oxygen in a three-phase system, according to which hydrogen and oxygen in the gaseous state are reacted directly at the surface of a solid heterogeneous catalyst, the reaction being performed continuously in a reactor with a stationary trickle bed, filled with solid catalyst particles forming the stationary bed through which a liquid consisting of an aqueous solution and the gaseous phase containing the hydrogen and oxygen are caused to trickle concurrently.

Direct synthesis of an aqueous solution of hydrogen peroxide is intended to denote the synthesis of solutions of $H_2O_2$ in water from its elements, namely oxygen and hydrogen. According to the invention, these two reactants are introduced under conditions adjusted so that they are in the gaseous state, the pressure being nevertheless chosen to be equal or higher than atmospheric pressure.

According to the invention the reaction is performed continuously in a reactor with a stationary trickle bed. A reactor of this type is intended to denote a three-phase reactor in which a liquid and a gas travel concurrently from the top downwards through a stationary bed of porous solid catalyst particles in contact with which they react. In this reactor the liquid flows as a film at the surface of the particles, while the gas forms the continuous phase.

In the process according to the invention the two gaseous reactants, oxygen and hydrogen, are brought into contact with the aqueous solution which trickles at the surface of the stationary bed consisting of the catalyst particles. The gaseous oxygen and hydrogen can also be diluted in an inert gas. Inert gas is intended to denote a gas which does not react with oxygen and hydrogen, nor with the catalyst and the hydrogen peroxide produced. Examples of these inert gases are nitrogen, the rare gases and carbon dioxide. Nitrogen has given good results.

The catalyst in accordance with the process according to the invention belongs to the class of the solid catalysts employed in heterogeneous catalysis, that is to say a catalysis which takes place at the interface between the catalytic solid and one or a number of other phases containing the reactants. According to the invention, the solid catalyst is kept in contact with an aqueous liquid phase capable of collecting and dissolving the hydrogen peroxide formed.

The catalyst comprises at least one group VIII metal impregnated onto a support. Palladium or the combination of palladium with another group VIII metal has given good results.

When the catalyst comprises a combination of palladium with one or a number of other group VIII metals, it is appropriate for the other metal to be distributed homogeneously in the bulk of the palladium. The homogeneous distribution of the other metal may be produced on an atomic scale, for example when the combination takes the form of a homogeneous alloy.

The distribution of the other metal(s) can also be produced on a more macroscopic scale such as, for example, the dispersion of small agglomerates of the other metal in the palladium or else the formation of a thin coating layer of the other metal around the palladium particles.

The other metal will be preferably chosen from platinum, rhodium and gold. It may also consist of a mixture of these metals. Among these metals, gold is preferred. The proportion by weight of the other metal in the combination may vary within broad limits. It is advantageous that it should not exceed approximately 80% of the total weight of the metals in the catalyst and, preferably, approximately 60% of the total weight of these metals.

The proportion by weight of palladium or of the combination of palladium with one or a number of other group VIII metals in relation to the support in the catalyst in accordance with the process according to the invention should be at least equal to approximately 0.1 g of palladium or of palladium and of one or a number of other group VIII metals per 100 g of the total weight of metals and support and, preferably, at least equal to approximately 1 g. Similarly, this proportion generally should not exceed approximately 10 g of palladium or of palladium and of one or a number of other group VIII metals per 100 g of the total weight of metals and support and, preferably, should not exceed approximately 5 g.

According to the invention the catalyst support comprises at least one compound chosen from carbon and inorganic oxides. Carbon is intended to denote, in particular, mineral coal or wood charcoal, as well as carbon black obtained by conversion of an organic substance. Inorganic oxides refer especially to alkaline-earth metal oxides, and zirconium, aluminium and silicon oxides.

When the catalyst support contains an alkaline-earth metal sulphate, barium sulphate is preferred.

In an alternative form of the process according to the invention, which is preferred, the liquid phase is made acidic by the addition of an inorganic acid. Sulphuric acid and orthophosphoric acid may be mentioned as suitable acids. The pH of the liquid phase is generally higher than or equal to 0 and, preferably, to approximately 0.5. It generally does not exceed approximately 4 and, preferably, approximately 1.5.

Besides their catalytic properties for the reaction of direct synthesis of hydrogen peroxide, the palladium catalysts can also decompose the peroxide formed. It may therefore be advantageous for the liquid phase to contain a compound capable of poisoning the sites for decomposition of hydrogen peroxide which are present at the surface of the catalst. Halide ions are good representatives of these compounds. Their optimum concentration must be determined by means of laboratory tests within the scope of a person skilled in the art. This concentration must be sufficient to make it possible to poison most of the decomposition sites of the catalyst and, at the same time, not too high so as to avoid, as much as possible, the reaction of oxidation of the halide ion by the hydrogen peroxide. Chloride, bromide and iodide ions are suitable for inhibiting the decomposition sites of the catalyst. The bromide ion has given excellent results in a concentration of at least approximately $10^{-6}$ gram-ion per litre of liquid phase and, preferably, of at least approximately $10^{-5}$ gramion. Similarly, the best results have been obtained with the bromide ion in a concentration not exceeding approximately $10^{-1}$ and, preferably, approximately $10^{-2}$ gram-ion per litre.

According to the invention the reactor containing a stationary trickle bed employed in the process may take all forms and sizes generally encountered for the production of reactors of this type. The operating conditions and the sizing of the reactor will be adapted to the purity of the reactants introduced and to the effectiveness of the catalyst employed. Preferably, care will be taken that the safety of operation should be as high as possible by avoiding mixing large volumes of gaseous hydrogen and oxygen while the gaseous composition obtained is in the explosiveness region.

A reactor containing a stationary trickle bed will preferably be chosen. The length of the tube of which this reactor consists may be advantageously chosen to be greater than or equal to approximately 0.5 m and, preferably, greater than or equal to approximately 1 m. It is also advantageous that the length of the tubular reactor should not exceed approximately 6 m and, preferably, approximately 5 m.

When a tubular reactor is chosen, it is advantageous that the internal diameter of the tube should be greater than or equal to approximately 5 mm and, preferably, greater than or equal to approximately 7 mm. Similarly, it is appropriate that this diameter should not exceed approximately 30 mm and, preferably, approximately 15 mm.

In the process according to the invention the flow rate of liquid trickling from the top downwards in the reactor is generally greater than or equal to approximately 0.1 l/h and, in most cases, greater than or equal to approximately 0.4 l/h. It is also desirable that this flow rate should not exceed approximately 50 l/h and, preferably, approximately 10 l/h.

The flow rates of gaseous hydrogen and oxygen in the process according to the invention will be advantageously regulated so that the composition of the gas mixture leaving the reactor lies outside the explosiveness region.

In the process according to the invention the gas flow rate and the liquid flow rate (which are expressed in l/h under normal conditions of pressure of 1 atmosphere and of temperature of 0° C.) are generally regulated so that the gas flow rate/liquid flow rate ratio is at least approximately 500, and, preferably, approximately 3,000. The gas flow rate is intended to denote the sum of the gas flow rates of hydrogen, oxygen and optionally of inert gas which are fed to the reactor. Similarly, the gas flow rate/liquid flow rate ratio is usually regulated so that it does not exceed approximately 10,000 and, preferably, approximately 6,000.

According to the invention, the stationary bed packing the reactor containing the stationary trickle bed consists of a packing of solid catalyst particles. It is generally advantageous that the average diameter of these particles should be at least approximately 10 μm and, preferably, approximately 100 μm. Similarly, it is frequently desirable that this average diameter should not exceed approximately 5,000 μm and, preferably, approximately 1,000 μm.

The temperature and the pressure prevailing inside the reactor will be carefully regulated to optimise the selectivity of the reaction in relation to the hydrogen consumed and the space time yield of hydrogen peroxide.

A temperature of at least approximately 0° C. and, preferably, of at least approximately 25° C. is generally suitable. Similarly, a temperature not exceeding approximately 90° C. and, preferably, approximately 70° C. is usually sufficient to obtain good results.

With regard to pressure, it is usual to choose a pressure at least equal to atmospheric pressure and, preferably, of at least approximately 50 bars. Similarly, it is frequently suitable to regulate the pressure below approximately 200 bars and, preferably, below approximately 150 bars.

The invention also relates to the use of the process described above for the production of an aqueous solution of hydrogen peroxide at a concentration higher than 0.3 g $H_2O_2$/100 g of solution and, in most cases, higher than 0.5 g $H_2O_2$/100 g of solution.

Figure 1:
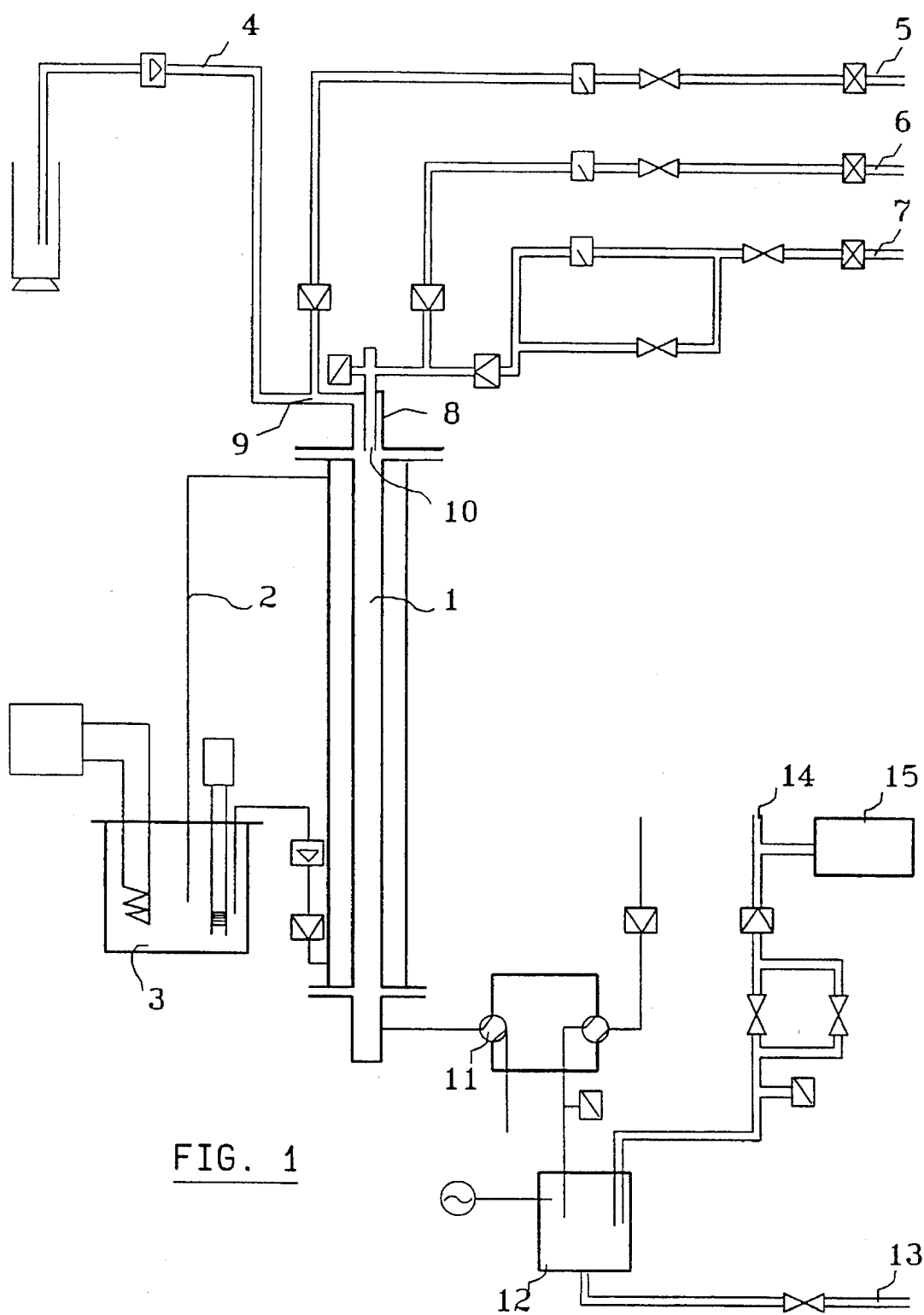
FIG. 1 is a diagrammatical representation of a reactor which can be employed in the process according to the invention.

An example of a reactor which can be employed in the process according to the invention has been shown diagrammatically in FIG. 1 and consists of a tube (1) made of passivated stainless steel of Hastelloy C grade, with an internal diameter of 10.3 mm and 1,200 mm in length. This reactor is fitted with a jacket in which a coolant liquid (2) is circulated, making it possible to remove the heat released by the reaction, and cooled by the cryostat (3).

In such a reactor the feed of the hydrogen (5) and oxygen (6) gaseous reactants and of inert gas (7) employed as diluent takes place concurrently with the liquid upstream of the upper part (8) of the reactor, which is raised vertically. The use of an inert gas makes it possible, besides its function as diluent, to adjust the quantities of reactants progressively when the reactor is started up and shut down.

The hydrogen is introduced into the liquid phase (9) and then added to the other gases into the reactor head (10), designed so as to maintain a gas head space of virtually negligable volume.

A four-way valve (11) makes it possible to take samples intended for determining the $H_2O_2$ formed. The mixture of the gases and of the liquid leaving the reactor is introduced into a separator (12) provided with a level regulator controlled so as to maintain a gas head space with a volume which is as small as possible. The liquid is collected by the pipework (13) and its weight is measured by means of a balance. Gaseous effluents have been removed via the pipework (14) and can be analysed by gas phase chromatography (15).

The examples which follow are given to illustrate the invention without, however, limiting its scope.

Example 1R is given by way of comparison and is not in accordance with the invention. Example 2 was performed in accordance with the invention.

EXAMPLE 1R (not in accordance with the invention)

750 mg of catalyst consisting of a carbon felt impregnated with Pd (total weight of Pd=1.5 mg) were weighed into a glass test tube and 40 ml of a 0.1N aqueous HCl solution were added.

The test tube was introduced into an autoclave thermostated at 10° C. and a polytetrafluoroethylene-coated bar magnet was placed therein as a stirrer. A thermocouple and a flexible polytetrafluoroethylene tube intended for feeding gases were then immersed in the test tube.

After the autoclave was closed, hydrogen at a pressure of 34 bars and oxygen at a pressure of 70 bars were allowed to enter as a mixture.

Ten minutes after the entry of the gases a violent explosion occurred and destroyed the test tube and the autoclave.

EXAMPLE 2

(in accordance with the invention)
Synthesis of long duration in a reactor in a stationary trickle bed A reactor identical with that of FIG. 1 was used.

The working volume of the reactor of FIG. 1 was approximately 0.1 l. The reactor was filled completely with 40 g of a Pd catalyst supported on active carbon granules with a mean diameter of between 150 and 250 μm in a proportion of 2% by weight of Pd relative to the total weight of the catalyst granules. This catalyst was prepared before the synthesis by neutralising an acidic solution of $PdCl_2$ containing granules of active carbon of trade mark CECA NC35 in suspension, and then drying the granules and reducing at 150° C. in a gas stream consisting of a mixture of hydrogen and nitrogen.

Throughout the duration of the continuous test which took place without incident over a period of 4 days the pressure was maintained at 60 bars and the temperature at 52° C. The reactor was fed with a liquid flow (4) of acidified water 0.1M in $H_2SO_4$ and 0 to 0.001M in NaBr. The liquid flow rate varied during the test between 0.45 and 1.14 l/h.

The oxygen flow rate was fixed at 15 l/min (under normal conditions of temperature of 0° C. and of pressure of 1 atmosphere), the hydrogen flow rate varied between 1.2 and 1.5 l/min under normal conditions and the flow rate of nitrogen between 8 and 10 l/min under normal conditions.

The various flow rates were measured and recorded continuously throughout the test period. An automatic safety system was installed to trigger an alarm in the event of abnormal values, as well as filling the reactor with nitrogen and cutting off the supplies of oxygen and hydrogen.

Figure 2:
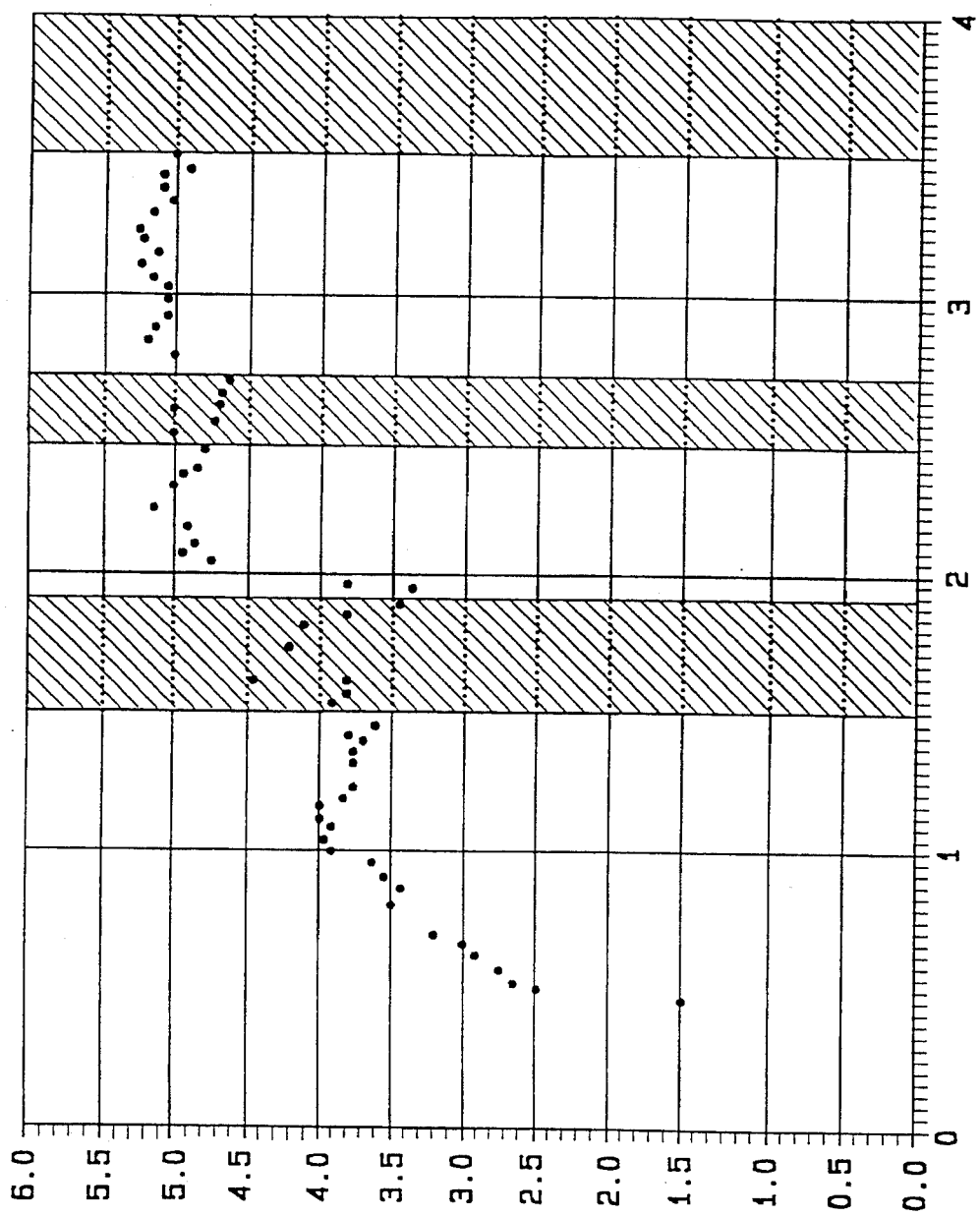
FIG. 2 is a diagram showing measurements of the $H_2 O_2$ concentration at the reactor exit (in g $H_2O_2$/100 g of solution) during a continuous test lasting 4 days.
Figure 3:
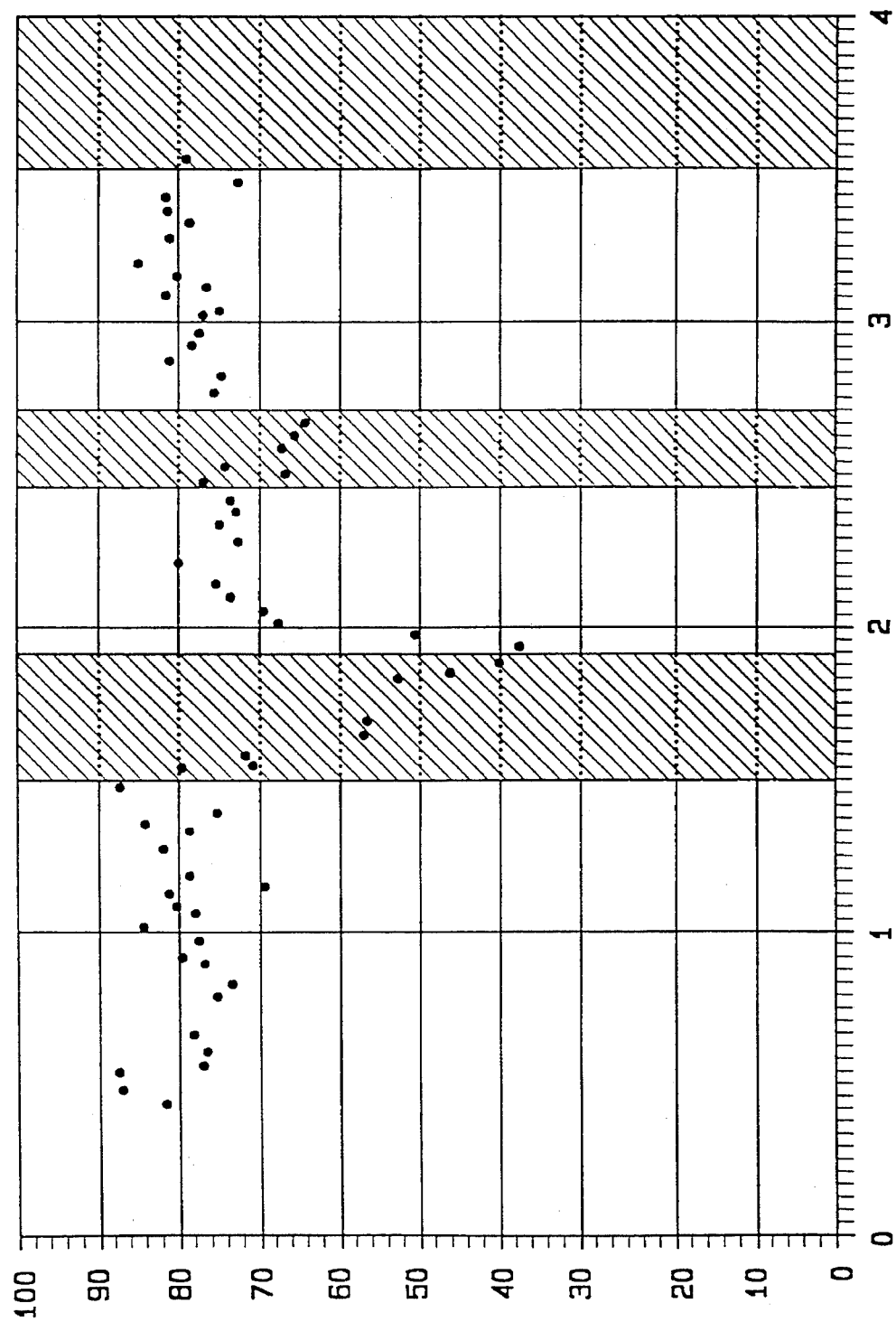
FIG. 3 is a diagram showing the reaction in relation to the hydrogen consumed during a continuous test lasting 4 days.

Measurements of the $H_2O_2$ concentration at the reactor exit (in g $H_2O_2$/100 g of solution) and the determination of the selectivity (in mol%) of the reaction in relation to the hydrogen consumed during a continuous test lasting 4 days have been shown in the diagrams of FIGS. 2 and 3, FIG. 2 giving the $H_2O_2$ concentrations and FIG. 3 the selectivities, the abscissae of these two diagrams showing the duration of the test, graduated in days. The periods marked with hatched lines correspond to a reactor feed with a liquid phase free from NaBr.

These results show that it is possible under these conditions to reach a $H_2O_2$ concentration of 5% by weight with a selectivity of 80 mol% relative to the hydrogen consumed.

Figure 4:
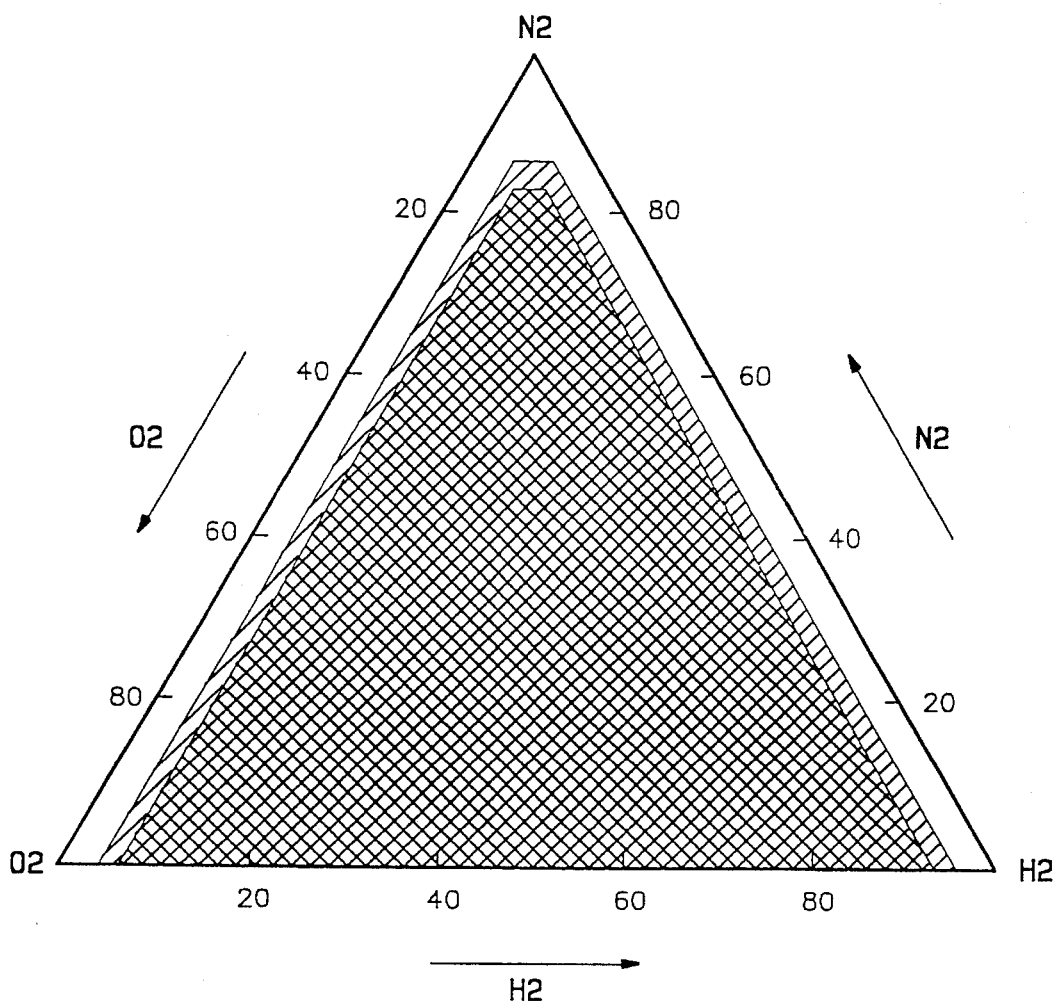
FIG. 4 is a ternary diagram showing the mixtures of the three gases $O_2$, $H_2$ and $N_2$ and their explosiveness hazards under temperature conditions of between 120° and 200° C. and pressure conditions of between 30 and 60 bars.
Figure 4:
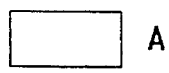
Figure 4:
Figure 4:

In the case of a concentration of 5% by weight of $H_2O_2$ at the reactor exit and with an average liquid flow rate of 0.8 l/h, 25 to 35% of the hydrogen introduced in the feed was consumed. It follows that the gaseous mixture at the exit of the reactor lies outside the explosiveness region, as can be concluded from the resulting composition of the gaseous mixture and from FIG. 4. This figure is a ternary diagram showing the mixtures of the three gases $O_2$, $H_2$ and $N_2$ and their explosiveness hazards under temperature conditions of between 120° and 200° C. and those of pressure of between 30 and 60 bars. Region A in the diagram shows the nonflammable compositions, region C that of the explosive compositions and region B that of the compositions close to the flammability limit.

We claim:

1. A process for the manufacture of an aqueous solution of hydrogen peroxide by direct synthesis from hydrogen and oxygen in a three-phase system, comprising:

continuously reacting a gas phase containing hydrogen and oxygen directly at the surface of a solid heterogeneous catalyst to form hydrogen peroxide, said gas phase reacting in a stationary trickle bed reactor filled with solid catalyst particles, having an average diameter of at least 10 μm and not exceeding 250 μm, forming the stationary bed through which a liquid consisting of an aqueous solution and the gas phase containing hydrogen and oxygen trickle concurrently, said liquid phase flowing as a film at the surface of the catalyst particles, and said gas phase forming the continuous phase, to obtain an aqueous solution of hydrogen peroxide at a concentration from 3 to 5 g $H_2O_2$/100 g of solution, and recovering aqueous solution of hydrogen peroxide at a concentration from 3 to 5 g $H_2O_2$/100 g of solution.

2. A process according to claim 1, wherein the reactor is of tubular shape and has a length of 0.5 to 6 m.

3. A process according to claim 1, wherein the reactor has an internal diameter of 5 to 30 mm.

4. A process according to claim 1, wherein the liquid phase has a flow rate ranging from 0.1 to 50 l/h.

5. A process according to claim 1, wherein gaseous hydrogen and oxygen have flow rates which are regulated so that the composition of the gas mixture leaving the reactor lies outside the explosiveness region.

6. A process according to claim 1, wherein the ratio of the gas flow rate to the liquid flow rate is not lower than 500 and does not exceed 10,000.

7. A process according to claim 1, wherein the stationary bed consists of solid catalyst particles of at least one group VIII metal impregnated onto a support comprising carbon, an inorganic oxide or an alkaline-earth metal sulphate.

8. A process according to claim 1, wherein the temperature in the reactor is from 0° to 90° C. and the pressure is equal to or higher than atmospheric pressure and lower than 200 bars.

9. A process according to claim 2, wherein the reactor has an internal diameter of 5 to 30 mm.

10. A process according to claim 2, wherein the liquid phase has a flow rate ranging from 0.1 to 50 l/h.

11. A process according to claim 2, wherein gaseous hydrogen and oxygen have flow rates which are regulated so that the composition of the gas mixture leaving the reactor lies outside the explosiveness region.

12. A process according to claim 2, wherein the ratio of the gas flow rate to the liquid flow rate is not lower than 500 and does not exceed 10,000.

13. A process according to claim 2, wherein the stationary bed consists of solid catalyst particles of at least one group VIII metal impregnated onto a support comprising carbon, an inorganic oxide or an alkaline-earth metal sulphate.

14. A process according to claim 2, wherein the temperature in the reactor is from 0° to 90° C. and the pressure is equal to or higher than atmospheric pressure and lower than 200 bars.

15. A process according to claim 2, wherein there is obtained an aqueous solution of hydrogen peroxide at a concentration of 5 g $H_2O_2$/100 g of solution.

16. The process set forth in claim 1, wherein said aqueous solution of hydrogen peroxide is recovered at a concentration of 3.0 g $H_2O_2$/100 g of solution.

17. The process set forth in claim 1, wherein said aqueous solution of hydrogen peroxide is recovered at a concentration of 3.5 g $H_2O_2$/100 g of solution.

18. The process set forth in claim 1, wherein said aqueous solution of hydrogen peroxide is recovered at a concentration of 4.0 g $H_2O_2$/100 g of solution.

19. The process set forth in claim 1, wherein said aqueous solution of hydrogen peroxide is recovered at a concentration of 5.0 g $H_2O_2$/100 g of solution.

* * * * *